C. W. SVENSON.
COASTER BRAKE.
APPLICATION FILED OCT. 25, 1916.
1,218,226.
Patented Mar. 6, 1917.
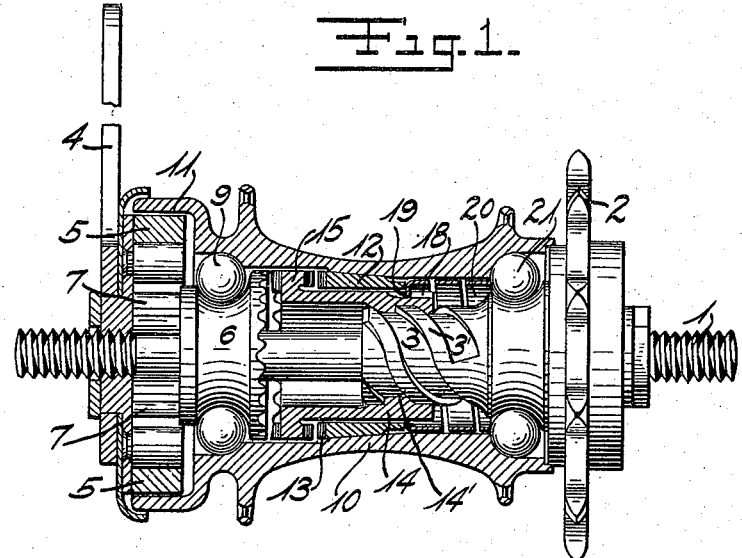
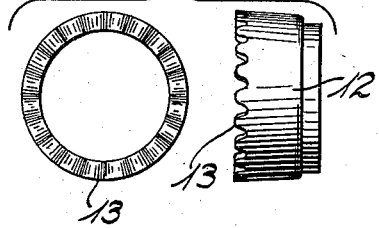
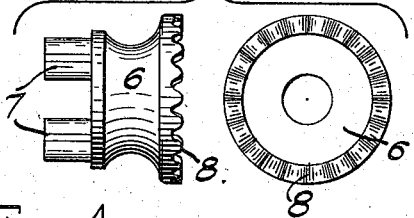
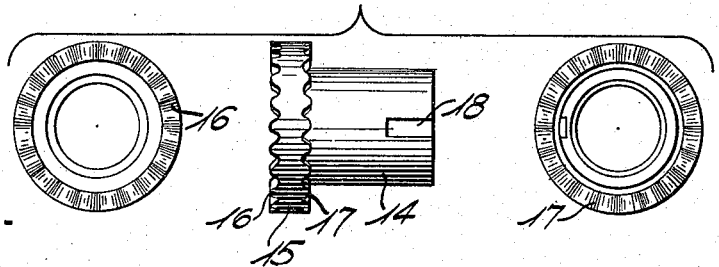
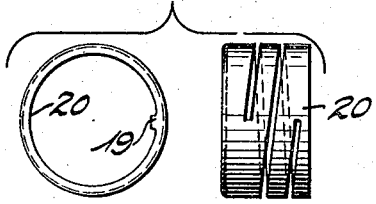
Inventor
Charles W. Svenson
By his Attorneys

UNITED STATES PATENT OFFICE.

CHARLES WALFRID SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

COASTER-BRAKE.

1,218,226.  Specification of Letters Patent.  Patented Mar. 6, 1917.

Application filed October 25, 1916. Serial No. 127,531.

*To all whom it may concern:*

Be it known that I, CHARLES W. SVENSON, a citizen of the United States, residing at New Britain, county of Hartford, State of Connecticut, have invented certain new and useful Improvements in Coaster-Brakes, of which the following is a full, clear, and exact description.

My invention relates to improvements in coaster brakes and has for its object to provide a brake in which the driving abutment and shell of the hub are free from certain radial strains in manufacture and use, and in which the abutment is formed separately from the shell of the hub. The following is a description of an embodiment of my invention, reference being had to the accompanying drawings, in which—

Figure 1 shows a longitudinal section of a brake embodying my invention.

Fig. 2 shows an end view and side elevation of a driving abutment member of the same.

Fig. 3 shows in side elevation and end view the brake actuator.

Fig. 4 shows a side elevation and two end views of a coupling member.

Fig. 5 shows in end view and side elevation a spring forming part of my hub.

Referring more particularly to the drawings, 1 is a stationary axle. 2 is a driving sprocket mounted to revolve thereon and provided with a cam extension 3. 4 is a stationary lever, carrying brake shoes 5 pivoted thereto. 6 is a brake actuator having projections 7 for actuating the brake shoes 5. The brake actuator is provided with teeth 8 and with anti-friction balls 9. The features thus far referred to are of ordinary construction. Surrounding the brake shoes, actuator and cam extension is a hub shell 10 having an interior brake-engaging surface 11 and a slightly conical bore, on which is seated a removable tooth-carrying driving abutment member 12. This tooth-carrying member is so shaped as to engage the conical bore and be wedged tightly therein so as to be normally fixed relatively thereto, the larger ends of the conical surfaces of said driving abutment member and its seat being adjacent to the teeth on said abutment member, so that the pressure of the coupling member on the abutment member tends to force it to its seat. The face of the member 12 opposing the brake actuator is provided with teeth 13. Within the member 12 is a coupling collar 14 having internal screw threads 14' engaging the similar cam surfaces 3' on the cam extension 3. This coupling member is provided with a circumferential extension 15 having on its two faces teeth 16 and 17 adapted to engage with the teeth 8 and 13 respectively. The coupling is provided at its right hand end with a longitudinal slot or recess 18 in which enters a projection 19 carried by a spring 20 whose ends bear against the end of the member 12 and the anti-friction balls 21 carrying the driving sprocket and cam extension, the effect being to produce a drag on the coupling collar 14 so as to insure the engagement and disengagement of its teeth with the teeth 8 and 13. With the brake so constructed the shell of the hub is relieved of all radial strains during the formation of the teeth which engage with the teeth 17 when these teeth are formed by a hydraulic or drop press, as is usually the case, and inasmuch as the teeth 17 and 13 are in planes at right angles to the axis of said stationary axle and are not inclined relatively to the axis of the shell, are relieved of radial strains that would be present if the teeth were inclined as shown in patent to Glover, No. 735,087, August 4, 1903. Moreover, the tooth-carrying member 12 is easily manufactured and the teeth thereon more easily formed than they could be if made integral with the shell.

The operation of the brake is as follows:

To drive the hub through the sprocket 2, the sprocket is driven clockwise, (looking at its end from the right). This causes the cam extension 3 to revolve and draw the coupling 14 toward the right so that the teeth 17 engage the teeth 13, locking the coupling to the hub shell so that a continued rotation of the sprocket drives the hub. A reverse movement of the sprocket causes the coupling 14 to move toward the brake actuator until the teeth 16 engage the teeth 8, moving the brake actuator so as to actuate the brake shoes 5—5, if the reverse movement of the sprocket is sufficient. If the reverse movement of the sprocket is insufficient to cause the teeth 16 to engage the teeth 8, or if the sprocket is held stationary while the hub is revolving in a forward direction, the teeth 17 become disengaged from the teeth 13 without having the teeth 16 engage the teeth 8 and the shell runs free, the teeth of the coupling standing in an intermediate position. When the teeth upon the coupling 14 engage teeth upon either the abutment member 12 or the actuator 6, a positive coupling action takes place so that a positive drive or a positive braking action takes place.

The teeth 8 and 13 easily separate from the teeth 16 and 17 when the holding force is removed from the member 14, being rounded or wavy so as to be disengaged by a cam-like action. The use of teeth of this form results in the elimination of the clicking noise sometimes heard when sharp ratchet teeth are used.

As will be evident to those skilled in the art, my invention permits of various modifications without departing from the spirit thereof or the scope of the appended claims.

What I claim is:

1. In a coaster brake the combination of a stationary axle; a sprocket having a cam extension projecting therefrom; a coupling having a cam surface engaging said cam extension; a hub shell surrounding said extension and coupling, and provided with a conical seat; and a separately formed driving abutment member having a conical exterior fitting said conical seat so as to be held from rotation relatively to said hub, said coupling member and driving abutment being provided with opposing teeth adjacent to the larger end of said abutment member.

2. In a coaster brake the combination of a stationary axle; a sprocket having a cam extension projecting therefrom; a coupling having a cam surface engaging said cam extension; a brake actuator; a brake; a hub shell surrounding said extension, coupling and brake actuator, and provided with a conical seat; a separately formed driving abutment member, having a conical exterior fitting said conical seat and held by said shell from rotation relatively thereto, said coupling member and driving abutment being provided with opposing rounded teeth adjacent to the larger end of said abutment member, and said coupling member and brake actuating member being also provided with rounded opposing teeth.

CHARLES WALFRID SVENSON.

Copies of this patent may be obtained for five cents each, by addressing the "Commissioner of Patents, Washington, D. C."